United States Patent
Hofschneider

(10) Patent No.: US 7,399,150 B2
(45) Date of Patent: *Jul. 15, 2008

(54) CONNECTING ELEMENT

(75) Inventor: Manfred Hofschneider, Wuppertal (DE)

(73) Assignee: Altenloh, Brinck & Co. GmbH & Co. KG, Ennepetal (DE)

( * ) Notice: Subject to any disclaimer, the term of this patent is extended or adjusted under 35 U.S.C. 154(b) by 0 days.

This patent is subject to a terminal disclaimer.

(21) Appl. No.: 11/514,120

(22) Filed: Aug. 31, 2006

(65) Prior Publication Data

US 2006/0291980 A1 Dec. 28, 2006

Related U.S. Application Data

(63) Continuation of application No. 10/332,477, filed on Jun. 2, 2003, now Pat. No. 7,118,317.

(30) Foreign Application Priority Data

Jul. 13, 2000 (DE) ............................. 200 12 107 U

(51) Int. Cl.
*F16B 23/00* (2006.01)

(52) U.S. Cl. .................... 411/399; 411/380; 411/537

(58) Field of Classification Search ................ 411/380, 411/381, 399, 432, 533, 537, 501, 504–507, 411/402; 285/334.4

See application file for complete search history.

(56) References Cited

U.S. PATENT DOCUMENTS

| | | | | |
|---|---|---|---|---|
| 1,264,569 A | * | 4/1918 | Stafford | 411/374 |
| 1,354,610 A | * | 10/1920 | Flannery et al. | 411/374 |
| 1,447,068 A | * | 2/1923 | Flannery | 411/380 |
| 1,507,841 A | * | 9/1924 | Landgraf | 411/380 |
| 3,135,154 A | * | 6/1964 | Zenzic | 411/12 |
| 3,313,197 A | * | 4/1967 | Knohl | 411/387.1 |
| 3,429,581 A | * | 2/1969 | Himmel | 277/625 |
| 4,127,037 A | * | 11/1978 | Weaver | 74/89.23 |
| 4,717,299 A | | 1/1988 | Underwood | |
| 5,143,410 A | * | 9/1992 | Takikawa | 285/197 |
| 5,405,227 A | | 4/1995 | His et al. | |
| 5,534,032 A | * | 7/1996 | Hodorek | 623/20.32 |

FOREIGN PATENT DOCUMENTS

DE 3027191 A1 2/1982

* cited by examiner

*Primary Examiner*—Flemming Saether
*Assistant Examiner*—David C Reese
(74) *Attorney, Agent, or Firm*—Brinks Hofer Gilson & Lione

(57) ABSTRACT

The present invention concerns a fastener arrangement made of a component and a screw element with an area for the application of force for a turning tool, where the component and the screw element, when fastened to each other, are in contact with each other by way of contact surfaces, and where the contact surface of the screw element on the side facing the component, has a convexly curved outer surface, and where the contact surface of the component has a concavely curved inner surface, while the outer surface and the inner surface are positioned coaxially with respect to a common longitudinal axis, which runs through the component and the screw element.

2 Claims, 1 Drawing Sheet

CONNECTING ELEMENT

CROSS-REFERENCE TO RELATED APPLICATION

This application is a continuation U.S. patent application Ser. No. 10/332,477, filed Jun. 2, 2003 now U.S. Pat. No. 7,118,317.

BACKGROUND OF THE INVENTION

The present invention generally relates to connecting elements used, for example, for the attachment of automobile wheels or rims to a motor vehicle by means of wheel bolts. More specifically, the present invention relates to a method for implementing fastener arrangements or screw elements to avoid deformation and damage of the outer and inner surfaces of such connecting elements.

In the case of known fasteners, it is a disadvantage that the outer surface of the screw element and/or the inner surface of the component are frequently deformed and damaged when the screw element is repeatedly screwed in, because the contact of the outer surface of the screw element, depending on the dimensioning of the screw element and the component, occurs either in the region of the front or rear edge, when viewed in the direction in which the screw element is screwed in, of the concavely curved inner surface of the component.

Such deformations cause significant problems during assembly when a defined torque is selected. In addition, with the prevailing final tolerance stack-ups extremely variable load configurations result, namely so-called outer load supports and inner load supports, and thus strongly varying frictional moments result when the head makes contact.

The solutions embodying the principles of the present invention are based on the recognition that the unfavorable forced contact conditions in the region of the front or rear edge, in the direction in which the screw is screwed in, of the concavely curved inner surface of the component, result from the fact that the centers of curvature of the curvature of the outer surface and the curvature of the inner surface are not spaced apart from each other in a direction vertical to the longitudinal axis.

As a result, the contact between the outer surface and the inner surface occurs, when viewed in the direction in which the screw is screwed in, either at a front or a rear edge region of the inner surface. Because of these unfavorable force conditions, deformation and damage of the outer and inner surfaces can occur, which result in an adverse effect on the fastening ability, for example, in the case of a defined torque.

It is desirable to create a fastener arrangement or a screw element of the same kind where the contact surfaces are deformed or damaged as little as possible even if they are loosened or fastened a number of times, and where, in addition, the extreme outer and inner load supports are to be avoided.

A method of connecting elements embodying the principles of this invention is by creating a fastener arrangement, where the contact surfaces in an axial section of the fastener device are defined by arcuate sections curved in such a way, that the center(s) of curvature of the convexly curved outer surface extending in a direction perpendicular to the longitudinal axis is (are) located at such a distance from the center(s) of curvature of the concavely curved inner surface, that the contact surfaces, when they are fastened to each other, are located between the ends of their arc sections.

Furthermore, the above objective is achieved by a screw element according to the principles of this invention, where the contact surfaces are defined, in an axial section of the screw element, by curved arc sections, the centers of curvature of which are located at such a distance from the longitudinal axis that the convexly curved outer surface and the concavely curved inner surface of the component, when they are fastened to each other, are in contact with each other between the ends of their arcuate sections.

BRIEF SUMMARY OF THE INVENTION

The present invention concerns a fastener arrangement consisting of a component and a screw element with an area for the application of force for a turning tool, where the component and the screw element, when fastened to each other, are in contact with each other by way of contact surfaces, and where the contact surface of the screw element on the side facing the component, has a convexly curved outer surface, and where the contact surface of the component has a concavely curved inner surface, while the outer surface and the inner surface are positioned coaxially with respect to a common longitudinal axis, which runs through the component and the screw element.

The invention concerns also a screw element with an area for the application of force for a turning tool and a contact surface shaped as a convexly curved outer surface for contact with a concavely curved inner surface of a component, which contact surface points in the direction in which the screw element is screwed in, where the outer surface of the screw element and the inner surface of the component are positioned coaxially with respect to a longitudinal axis running through the component and the screw element.

BRIEF DESCRIPTION OF THE DRAWINGS

The figures, and the following description, will more clearly demonstrate the various advantages of the present invention.

In the different figures of the drawings equal parts are always shown with the same reference numerals.

DETAILED DESCRIPTION OF THE INVENTION

In the case of a fastener arrangement in accordance with the principles of this invention, by means of creating a separation between the centers of curvature in a direction perpendicular to the longitudinal axis, a contact in the central region of the outer and inner surfaces in the direction of screw engagement is produced; however, the edge regions, which are relatively vulnerable to deformation, experience no load or a relatively low load.

The fastener arrangement or the screw element, therefore, permits a fastening operation, even for multiple use, with a defined torque. In accordance with the principles of this invention, the overall load is reduced to such an extent that the diameter, which determines the friction moment, experiences only minor dimensional changes, so that ultimately only small changes in the desired tensioning forces occur.

Figure 1:
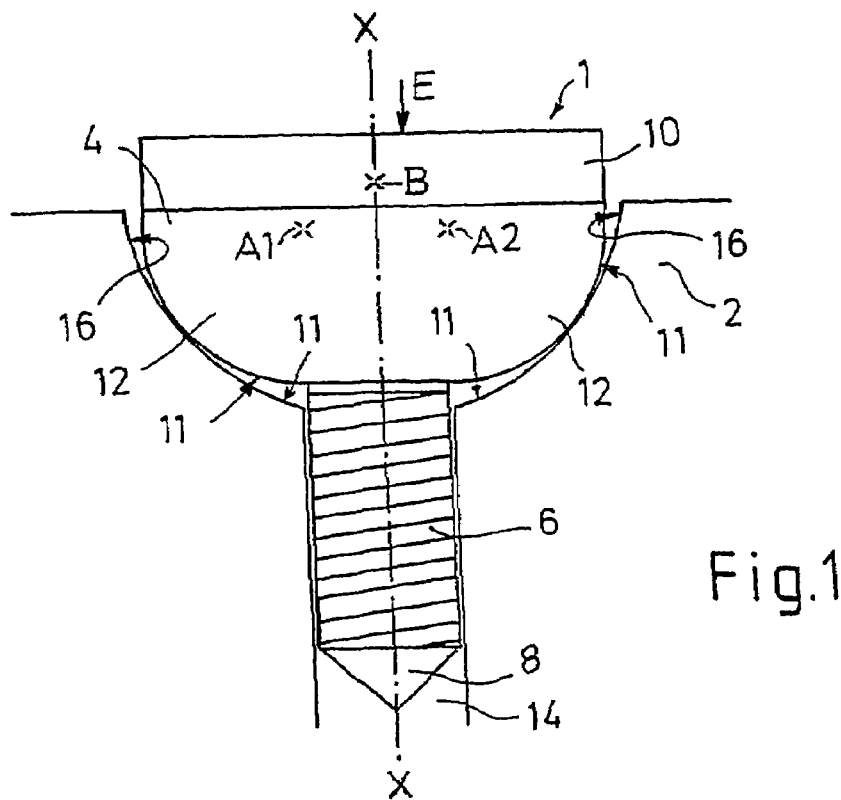
FIG. 1 is a cross-sectional view revealing the axial section of one embodiment of the fastener arrangement embodying the principles of the present invention.
Figure 2:
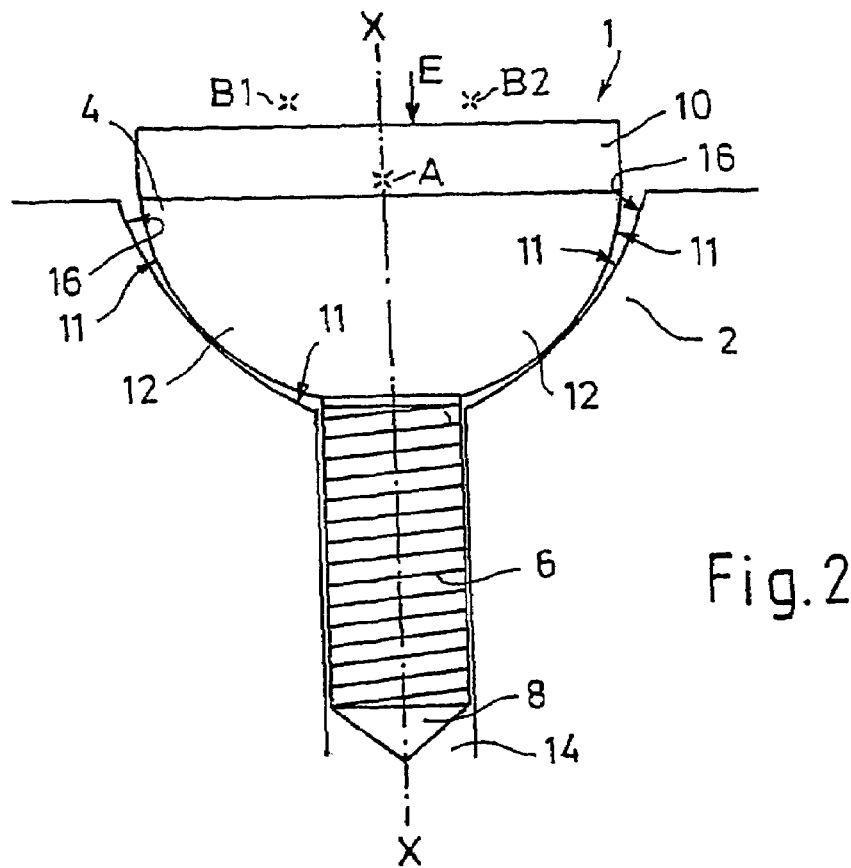
FIG. 2 is a cross-sectional view revealing the axial section of another embodiment of the fastener arrangement embodying the principles of the present invention.

FIGS. 1 and 2 show, in an axial section through the longitudinal axis X-X, a screw element 1 in accordance with the invention, for example a screw, which can be screwed into a component 2 in the direction of thread engagement E. The screw element 1 shows a screw head 4 and threaded shaft 6 adjacent to it, with a screw point 8 located at its free end. The screw head 4 consists of a force application area 10 and a contact surface 11, which is turned toward the component 2, which contact surface is formed as a convexly curved outer surface 12, which curves around at least one center of curvature A. The area of force application 10 can, for example, be in the form of a hexagon, an interior hexagon, a slot, a cross recessed head, or the like. The component 2 has an opening 14 for the threaded shaft 6 and a contact surface 11 for receiving the convexly curved outer surface 12. The contact surface 11 is configured as an inner surface 16, which is concavely curved around at least one center of curvature B. The convexly curved outer surface 12 and the concavely curved inner surface 16 are coaxial with respect to a longitudinal axis X-X.

In the embodiment shown in FIG. 1 as an axial section, the outer surface 12 of the screw is convexly curved in such a manner that its centers of curvature A1, A2 are, in contrast to the center of curvature B of the inner surface 16, not located on the longitudinal axis X-X. This results in the fact that the contact does not occur at the front or rear edge region, when viewed in the direction in which the screw is screwed in, or at the ends of the concave or convex arc sections, but rather in the central region of the inner surface 16.

In FIG. 2 a second embodiment in accordance with the invention is shown in an axial section, where the inner surface 16 of component 2 is concavely curved in such a manner, that its centers of curvature B1, B2 are, in contrast to the center of curvature A of the outer surface 12, not located on the longitudinal axis X-X. This arrangement as well guarantees that the contact occurs not at the edge regions of the inner surface 16 or at the ends of the concave or convex arc sections.

The invention is not limited to the examples of the embodiment shown and described, but also includes all embodiments acting in an equivalent manner within the spirit of the invention; for example, a nut, which is threaded onto threaded shaft 6, can also serve as a screw element, which is located in a concavely curved inner surface 16. Also, a combination of the embodiments shown in FIGS. 1 and 2 is conceivable, where the arc section of the concavely curved inner surface 16 as well as the arc sections of the outer surface 12 are each curved in the axial section around two centers A1, A2; B1, B2. Furthermore, the arc sections cannot only be defined as circular sections, but also, for example, as elliptical sections.

The invention claimed is:

1. A screw element for engagement with a component having a concavely curved inner surface defining a longitudinal axis extending therethrough and also defining a radius of a single center of a curvature comprising:
   a force application area for a turning tool; and
   a contact surface which points in the direction in which the screw element is screwed in, and which contact surface is configured as a convexly curved outer surface configured for making contact with the concavely curved inner surface of the component, where the convexly curved outer surface of the screw element and the concavely curved inner surface of the component are coaxial with respect to the longitudinal axis which extends through the component and the screw element, wherein the contact surface defines when viewed in axial cross section of the screw element circular sections having centers of curvatures which are spaced from the longitudinal axis such that the convexly curved outer surface of the screw element and the concavely curved inner surface of the component are configured so as when fastened to each other they are in contact with each other between ends of the circular sections, the circular sections of the convexly curved outer surface define centers of curvature that are spaced apart from each other in a direction extending perpendicular to the longitudinal axis, and where the radius belonging to the center of curvature of the concavely curved inner surface is longer than the radii of the centers of curvature circular sections of the convexly curved outer surface.

2. A screw element and component comprising:
   a force application area of the screw element for a turning tool; and
   a contact surface of the screw element which points in the direction in which the screw element is screwed in, and which contact surface is configured as a convexly curved outer surface for making contact with a concavely curved inner surface of the component, where the outer surface of the screw element and the inner surface of the component are coaxial with respect to a common longitudinal axis that extends through the component and the screw element, wherein the contact surface when viewed in axial cross section of the screw element defines circular sections having centers of curvatures in such a manner that the convexly curved outer surface and the concavely curved inner surface of the component are in contact with each other between ends of the circular sections when they are fastened to each other, wherein the circular sections of the convexly curved outer surface have a common center of curvature and wherein the circular sections defined by the concavely curved inner surface have centers of curvature spaced apart from the common center of curvature, where the radius belonging to the centers of curvature of the circular sections of the convexly curved outer surface is shorter than the radii of the center of curvature of the concavely curved inner surface.

* * * * *